United States Patent Office 3,477,799
Patented Nov. 11, 1969

3,477,799
TREATMENT OF PLASTIC SURFACES
Charles S. Garnett, Olean, N.Y., assignor of fifty percent to William Simmons, Hornell, N.Y.
No Drawing. Filed July 19, 1966, Ser. No. 566,224
Int. Cl. D06p 5/00, 1/68
U.S. Cl. 8—4
7 Claims

ABSTRACT OF THE DISCLOSURE

A mixture of vinegar, aqueous ammonia, carbon tetrachloride and turpentine renders plastic surfaces dye-receptive.

---

This invention relates to compositions for rendering so-called plastics dye-receptive and is particularly directed to such a composition which is highly successful on vinyl type synthetic resin plastics.

Various synthetic resins are currently employed in the manufacture of articles such as shoes, coats, pocketbooks, upholstery and the like and it is well known that these materials are not receptive to alteration of their color by dyeing methods such as are used in conjunction with leather goods. Classically, ordinary dyeing or staining procedures are ineffective in conjunction with synthetic resinous materials, there being a substantial lack of adhesion of the coating or dyeing material to the synthetic resinous substrate with the result that cracking and peeling of the dye or coating material results. Consequently, synthetic resinous materials are conventionally considered non-receptive to dyeing or coating such as would alter their surface appearance and/or color whereas were this difficulty to be overcome, various articles or goods could be rejuvenated or altered in appearance in such fashion as to render them useable.

It is therefore of primary concern in connection with this invention to provide means for rendering synthetic resinous materials receptive to dyeing or coating.

More particularly, it is an object of this invention to provide a composition for rendering synthetic resinous materials dye-receptive which consists of a mixture of readily available materials. In particular, this invention envisages a composition consisting of a mixture of vinegar, aqueous ammonia, carbon tetrachloride and turpentine in which these materials are present in about equal proportions by volume. The composition requires no special process being simply a mixture of the above noted ingredients.

The composition according to the present invention is applied to the surface of a synthetic resinous material which is desired to be dyed or coated and when the material has been thoroughly wetted and allowed to stand for a few minutes, any excess may be wiped off and the desired dye or coloring material of liquid form may be applied thereto. Although the process by which the present invention prepared the surface of the synthetic resinous material for the reception of dye is not known, the material appears to become softened and rendered somewhat porous by the composition according to the present invention so that if a dyeing or coating material is applied while the synthetic resinous material is in this softened and porous form, the coating or dyeing material will penetrate into the body of the synthetic resinous material so that when dry, the coating will not peel or crack and will, in fact, affix itself with a good bond at the surface of the synthetic resinous material. To this end, the coating or dyeing material may be applied to the treated synthetic resinous surface at any time while the same is still impregnated with the composition of the present invention.

After application of the composition according to this invention, the surface of the synthetic resinous material is altered for dye receptivity and will retain this altered condition only so long as the composition has not been dried from the material. With respect to this, it is often possible to permit the material to be dyed to stand for some time before the application of the dye or coloring material whereas the volatilizing agents present in the dyeing or coloring material appear to hasten the drying once having been applied.

The dye or coloring material suitable for use on synthetic resinous materials treated with the composition according to the present invention may consist of any commercially available dye such as common shoe dye or conventional household dye or, for that matter, the coating material may be any agent which is conventionally applied in liquid form which adheres to the substrate by penetration and bonding thereto. Ordinary house paint can be successfully applied to synthetic resinous materials by using the composition of the present invention without cracking, peeling or blistering.

In this way, various articles of clothing and clothing accessories as well as upholstery items and the like may be altered as to color without danger of cracking, peeling or blistering simply by softening the surfaces thereof with the composition described hereinabove prior to the application of a suitable dye or coloring liquid.

Ts stated hereinabove, the composition of the invention consists of a mixture of turpentine, ammonia, vinegar and carbon tetrachloride. I have found, however, that the dye receptivity is sharply degraded if the ingredients are varied materially either in proportion or composition from the following:

(1) Apple cider vinegar, 5% acidity, 1 part
(2) Liquid turpentine, pure gum spirits, 1 part
(3) Aqueous ammonia, 29% solution, 1 part
(4) Carbon tetrachloride, 1 part I do not know either the mechanism by which the dye receptivity effect is achieved or the reason why variation from the above proportions or compositions degrades this effect. I have, however, observed the degradation in dye receptivity effect produced both by variation from the above equal parts by volume and by variation from the above noted composition. For example, I have determined that other and different vinegars are materially less effective than apple cider vinegar of 5% acidity, that other types of turpentine are materially less effective and that other and different strengths of the ammonia solution materially degrade the dye receptivity effect.

I claim:
1. A composition for softening synthetic resinous materials so as to make then dye-receptive obtained by mixing together substantially equal parts by volume of apple cider vinegar—5% acidity, aqueous ammonia—29% solution, liquid turpentine—pure gum spirits, and carbon tetrachloride.

2. The process of dyeing synthetic plastic materials which comprises the steps of:
   applying a composition, obtained by mixing together substantially equal parts by volume of apple cider vinegar—5% acidity, aqueous ammonia—29% solution, liquid turpentine—pure gum spirits, and carbon tetrachloride, to a synthetic plastic surface,
   applying a coloring material to the plastic surface while the plastic surface is impregnated with the composition, and
   allowing the coated surface to dry.

3. The process according to claim 2 wherein said coloring material is a dye for leather goods.

4. The process according to claim 2 wherein said coloring material is a paint.

5. The process of refinishing synthetic plastic surfaces which comprises the steps of:
 applying a composition, obtained by mixing together substantially equal parts by volume of apple cider vinegar—5% acidity, aqueous ammonia—29% solution, liquid turpentine—pure gum spirits, and carbon tetrachloride, to a synthetic plastic surface,
 applying a coloring material to the plastic surface while the plastic surface is impregnated with the composition, and
 allowing the coated surface to dry.

6. The process according to claim 5 wherein said coloring material is a dye for leather goods.

7. The process according to claim 5 wherein said coloring material is a paint.

References Cited

UNITED STATES PATENTS 3,399,025  8/1968  Nicholson.
3,432,251  3/1969  Fisher.

OTHER REFERENCES

C. E. Schildkneckt, Vinyl and Related Polymers, John Wiley & Sons, Inc., New York, (1952), pp. 425–427.

NORMAN G. TORCHIN, Primary Examiner

J. E. CALLAGHAN, Assistant Examiner

U.S. Cl. X.R.

8—82